J. SCHLEY.
Cotton Gin.

No. 5,921.

Patented Nov. 14, 1848.

UNITED STATES PATENT OFFICE.

JNO. SCHLEY, OF COLUMBUS, GEORGIA.

IMPROVEMENT IN ROLLER COTTON-GINS.

Specification forming part of Letters Patent No. 5,921, dated November 14, 1848.

*To all whom it may concern:*

Figure 3:
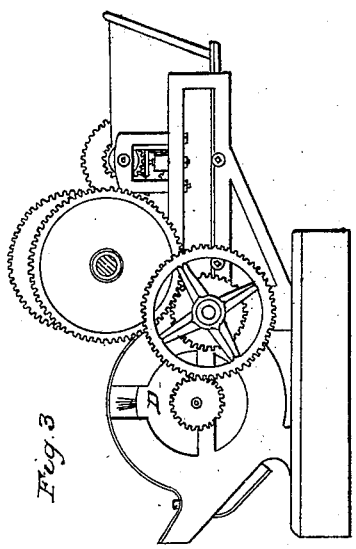
Figure 4:
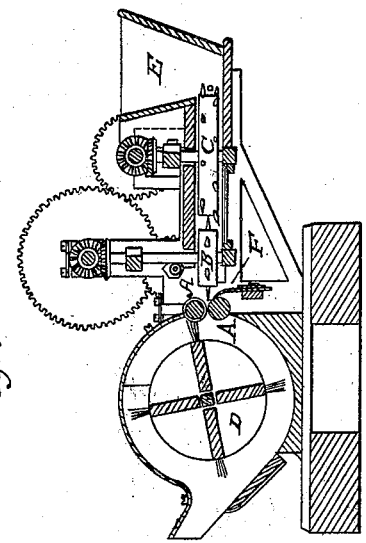
Figure 2:
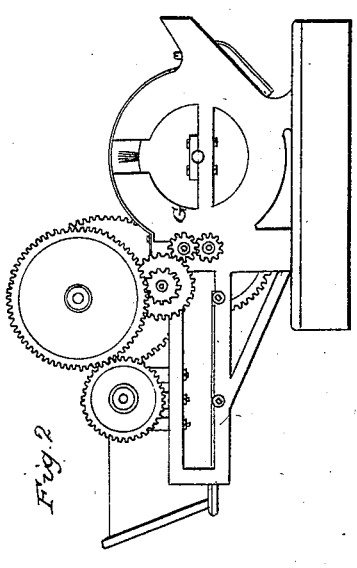
Figure 1:
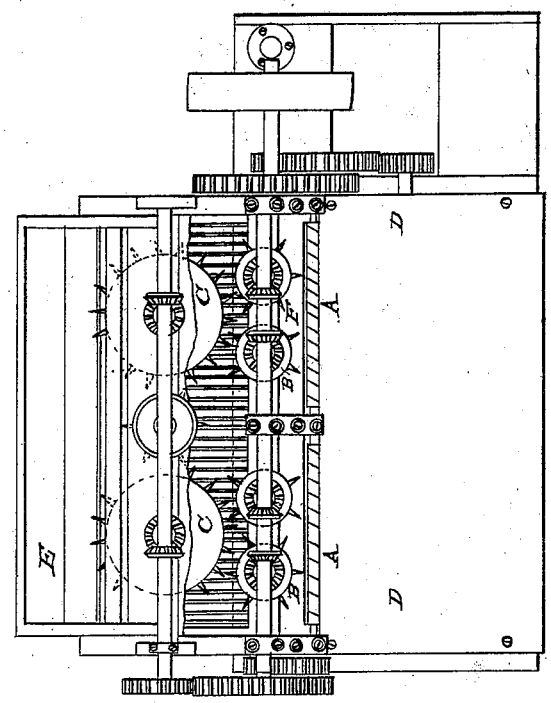

Be it known that I, JOHN SCHLEY, of the city of Columbus, Muscogee county, and State of Georgia, have invented a new and useful Improvement on the Roller-Gin; and I do hereby declare that the following is a full and exact description of the construction and operation of the same, reference being had to the annexed drawings, making a part of this specification, embracing Figures 1, 2, 3, and 4.

The nature of my invention or improvement consists in using, in combination, the ginning-rollers, a shell, and tooth-feeders, which will be perceived in the following description of the machine, to wit: I use or work two iron or steel rollers, one or both covered with leather, rawhide, gum-elastic, or other soft and elastic substance, (as is shown at letter A in the annexed drawings,) for the ginning of cotton without breaking or injuring the staple or fiber. A thin shell made of iron or steel, from a sixteenth to an eighth of an inch thick, bent or curved in the shape of the lower roller, or with a small rise or curve forward at the top edge of said shell, which rise or curve at the top of said shell is intended to work up close in the niche or space between the rollers to act as a barrier or an obstacle to prevent the seed from passing through the rollers, and to throw the seed back. Said shell is placed stationary in front of the lower roller, as is shown at letter F in the annexed drawings. The use and object of said shell is to cover the lower roller and run up into the niche or space between the rollers, so close to the top roller as to exclude all seeds, and even large motes; and tooth-feeders, constructed of either a toothed endless chain or toothed wheels, which run horizontal, and the teeth of which, in either case, are intended to work or run up into the niche or space between the rollers to carry the cotton up to the rollers, so they will be seen to take hold of it, and also act on and assist in moving and clearing away any seed that may hang to or clog up the rollers, and to prevent the rollers choking, as is shown at letter B in the annexed drawings.

For the purpose of more effectually cleaning away the seed, and also to prevent the main rollers from choking, a rod or slat of iron may be used, with teeth or spikes in it, which runs the whole length of the main rollers just under the teeth or spikes in the tooth-feeders above described, which rod or slat, with teeth or spikes in it, has an alternate or traverse motion, which is given to it by means of an eccentric wheel upon the end of one of the rollers, which I do not claim in combination.

Letter C in the annexed drawings represents a toothed wheel used for taking the cotton from the hopper E, which I do not claim in combination, and supplying and feeding the said tooth-feeders above first described.

To extricate or relieve the main rollers from the cotton after it has passed through them and been separated from the seed, I use a double comb, similar to card-combs, as has been heretofore used, or a brush-wheel, as has been heretofore used, (shown at letter D in the annexed drawings,) which I do not claim in combination.

What I claim, then, as my invention, and desire to secure by Letters Patent, is—

The combination of the ginning-rollers and shell with the tooth-feeders constructed and operating substantially as herein first set forth.

JNO. SCHLEY.

Witnesses:
T. C. DONN,
Z. C. ROBBINS.